US012050678B2

(12) United States Patent
Vogel et al.

(10) Patent No.: US 12,050,678 B2
(45) Date of Patent: Jul. 30, 2024

(54) AUTHORIZATION BROKERING

(71) Applicant: Oracle International Corporation, Redwood Shores, CA (US)

(72) Inventors: Daniel M. Vogel, Seattle, WA (US); Danne Lauren Stayskal, Eastsound, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 98 days.

(21) Appl. No.: 17/571,338

(22) Filed: Jan. 7, 2022

(65) Prior Publication Data

US 2023/0222204 A1 Jul. 13, 2023

(51) Int. Cl.
*G06F 21/45* (2013.01)
*H04L 9/40* (2022.01)

(52) U.S. Cl.
CPC ............ *G06F 21/45* (2013.01); *H04L 63/068* (2013.01)

(58) Field of Classification Search
CPC ... G06F 21/45; H04L 63/068; H04L 63/0807; H04L 63/0815; H04L 63/0876; H04L 63/0884
USPC .......................................................... 726/6
See application file for complete search history.

(56) References Cited

U.S. PATENT DOCUMENTS

| | | | |
|---|---|---|---|
| 5,764,765 A | 6/1998 | Phoenix et al. | |
| 6,748,083 B2 | 6/2004 | Hughes et al. | |
| 7,437,081 B2 | 10/2008 | Mitchell et al. | |
| 8,761,401 B2 | 6/2014 | Sprunk et al. | |
| 8,782,774 B1 | 7/2014 | Pahl et al. | |
| 8,855,316 B2 | 10/2014 | Wiseman et al. | |
| 9,413,756 B1 * | 8/2016 | Wang | G06F 21/31 |
| 9,628,268 B2 | 4/2017 | Kiang et al. | |
| 9,960,465 B2 | 5/2018 | Dudley et al. | |
| 10,057,058 B2 | 8/2018 | Murakami et al. | |
| 10,476,863 B1 * | 11/2019 | Hanlon | H04L 63/108 |
| 10,666,657 B1 * | 5/2020 | Threlkeld | H04L 9/0643 |
| 10,678,906 B1 * | 6/2020 | Loladia | G06F 21/44 |
| 10,884,732 B1 | 1/2021 | Zolotow et al. | |
| 10,951,618 B2 * | 3/2021 | Baer | H04L 63/104 |
| 11,368,444 B2 * | 6/2022 | Dunjic | H04L 63/0807 |
| 2005/0138352 A1 | 6/2005 | Gauvreau et al. | |
| 2007/0065154 A1 | 3/2007 | Luo et al. | |
| 2007/0076884 A1 | 4/2007 | Wellbrock et al. | |
| 2007/0195774 A1 | 8/2007 | Sherman et al. | |
| 2007/0245414 A1 * | 10/2007 | Chan | H04L 9/3234 726/12 |
| 2011/0206204 A1 | 8/2011 | Sychev | |

(Continued)

OTHER PUBLICATIONS

International Application No. PCT/US2022/079655, International Search Report and the Written Opinion mailed on Mar. 1, 2023, 10 pages.

(Continued)

*Primary Examiner* — Samson B Lemma
(74) *Attorney, Agent, or Firm* — Kilpatrick Townsend & Stockton LLP

(57) ABSTRACT

A framework for managing credentials for access to a secured entity of an infrastructure service. For example, techniques for maintaining credentials for access to the secured entity within a trusted environment while utilizing the credentials for performance of actions within the infrastructure service.

20 Claims, 13 Drawing Sheets

(56) References Cited

U.S. PATENT DOCUMENTS

| | | | |
|---|---|---|---|
| 2011/0213979 A1 | 9/2011 | Wiseman et al. | |
| 2011/0265166 A1* | 10/2011 | Franco | H04W 12/062 |
| | | | 726/7 |
| 2014/0010234 A1 | 1/2014 | Patel et al. | |
| 2014/0068765 A1 | 3/2014 | Choi et al. | |
| 2014/0133652 A1 | 5/2014 | Oshida et al. | |
| 2014/0282972 A1* | 9/2014 | Fan | H04L 63/0815 |
| | | | 726/7 |
| 2015/0012990 A1* | 1/2015 | Copsey | H04L 47/803 |
| | | | 726/7 |
| 2016/0142409 A1* | 5/2016 | Frei | G06F 21/33 |
| | | | 713/176 |
| 2016/0182487 A1 | 6/2016 | Zhu et al. | |
| 2016/0241396 A1 | 8/2016 | Fu et al. | |
| 2016/0359626 A1 | 12/2016 | Fu et al. | |
| 2016/0366094 A1 | 12/2016 | Mason et al. | |
| 2017/0214525 A1 | 7/2017 | Zhao et al. | |
| 2017/0230173 A1 | 8/2017 | Choi | |
| 2018/0176091 A1 | 6/2018 | Yoon et al. | |
| 2019/0034936 A1 | 1/2019 | Nolan et al. | |
| 2019/0036821 A1 | 1/2019 | Levy et al. | |
| 2019/0349392 A1 | 11/2019 | Wetterwald et al. | |
| 2020/0084222 A1 | 3/2020 | William et al. | |
| 2020/0153831 A1* | 5/2020 | Baer | H04L 63/10 |
| 2020/0280855 A1* | 9/2020 | Avetisov | H04L 63/0884 |
| 2021/0258169 A1 | 8/2021 | Basu et al. | |
| 2021/0314157 A1* | 10/2021 | Wilson | H04L 67/146 |

OTHER PUBLICATIONS

International Application No. PCT/US2022/079919, International Search Report and Written Opinion mailed on Mar. 3, 2023, 13 pages.

U.S. Appl. No. 17/571,346, Non-Final Office Action mailed on Sep. 14, 2023, 13 pages.

* cited by examiner

AUTHORIZATION BROKERING

BACKGROUND

A cloud service provider (CSP) provides a variety of services to users or clients on demand using different systems and infrastructure services. The CSP provides infrastructure services that can be used by clients to build their own networks and deploy customer resources. In order for the client to be provided access to the CSP, the client may need to provide credentials to the CSP that grant the client access.

Legacy approaches for the credentials for accessing the CSP involved the CSP providing the credentials to the client, which in turn would be provided by the client to the CSP at the time of the request for a service to obtain access to the CSP. The credentials provided to the client may be utilized by a bad actor to perform unauthorized actions for the CSP. Accordingly, the credentials being shared with the client may be a point of weakness within a CSP.

SUMMARY

The present disclosure relates generally to a framework for managing credentials for access to a computing system, such as a cloud infrastructure service. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure is directed to one or more non-transitory, computer-readable media having instructions stored thereon, wherein the instructions, when executed by a computing system, may cause the computing system to receive a request for performance of an action from a client device, the request including an identifier of the client device and the action to be performed by a secured entity. The instructions may further cause the computing system to determine a subscriber corresponding to the client device based at least in part on the identifier of the client device, and determine that the subscriber has provided the client device authorization for performance of the action. Further, the instructions may cause the computing system to generate a credential for access to the secured entity on behalf of the client device based at least in part on a determination that the client device has authorization for performance of the action, maintain the credential separate from the client device, and utilize the credential for performance of the action on behalf of the client device.

An aspect of the present disclosure is directed to a computing system, comprising memory to store one or more credentials and one or more processors coupled to the memory, the one or more processors may receive a request for performance of an action by a secured entity, the request received from a client device. The one or more processors may further determine a subscriber corresponding to the client device based at least in part on an identifier of the client device, and determine that the subscriber has provided the client device authorization for performance of the action. The one or more processors may further generate a credential for access to the secured entity based at least in part on the determination that the subscriber has provided the client device authorization for performance of the action, store the credential in the memory, the credential being stored separate from the client device, and utilize the credential for performance of the action on behalf of the client device.

An aspect of the present disclosure is directed to a method for performing an action with a secured entity, comprising receiving, by a broker from a client device, a request for performance of an action by the secured entity, and determining, by the broker, that the client device is authorized for performance of the action. The method may further include generating, by the broker, a credential for access to the secured entity based at least in part on the determination that the client device is authorized for performance of the action, and utilizing, by the broker, the credential to cause the secured entity perform the action on behalf of the client device.

The foregoing, together with other features and embodiments will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Figure 9:
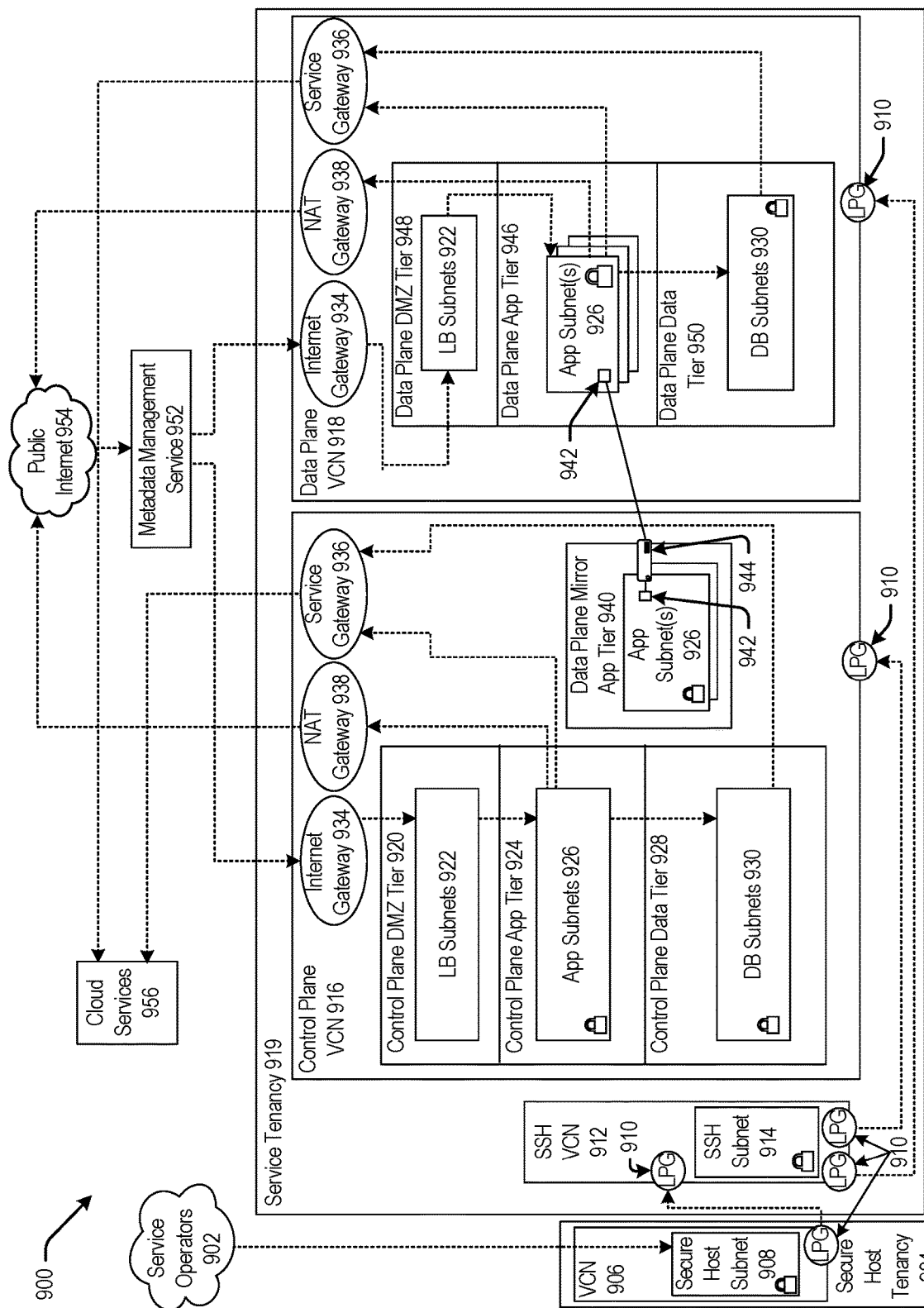
FIG. 9 is a block diagram illustrating one pattern for implementing a cloud infrastructure as a service system, according to at least one embodiment.
Figure 10:
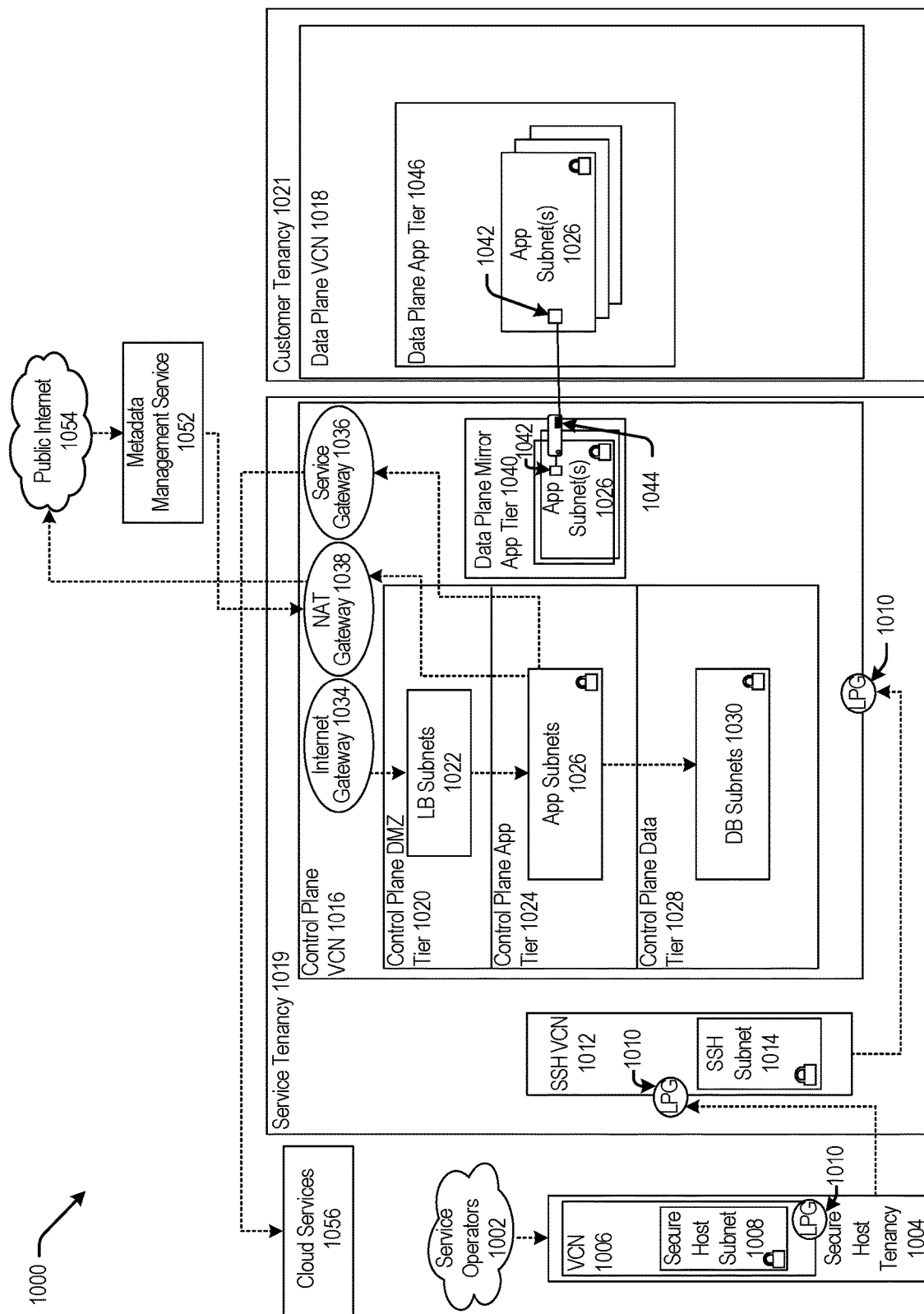
FIG. 10 is a block diagram illustrating another pattern for implementing a cloud infrastructure as a service system, according to at least one embodiment.
Figure 11:
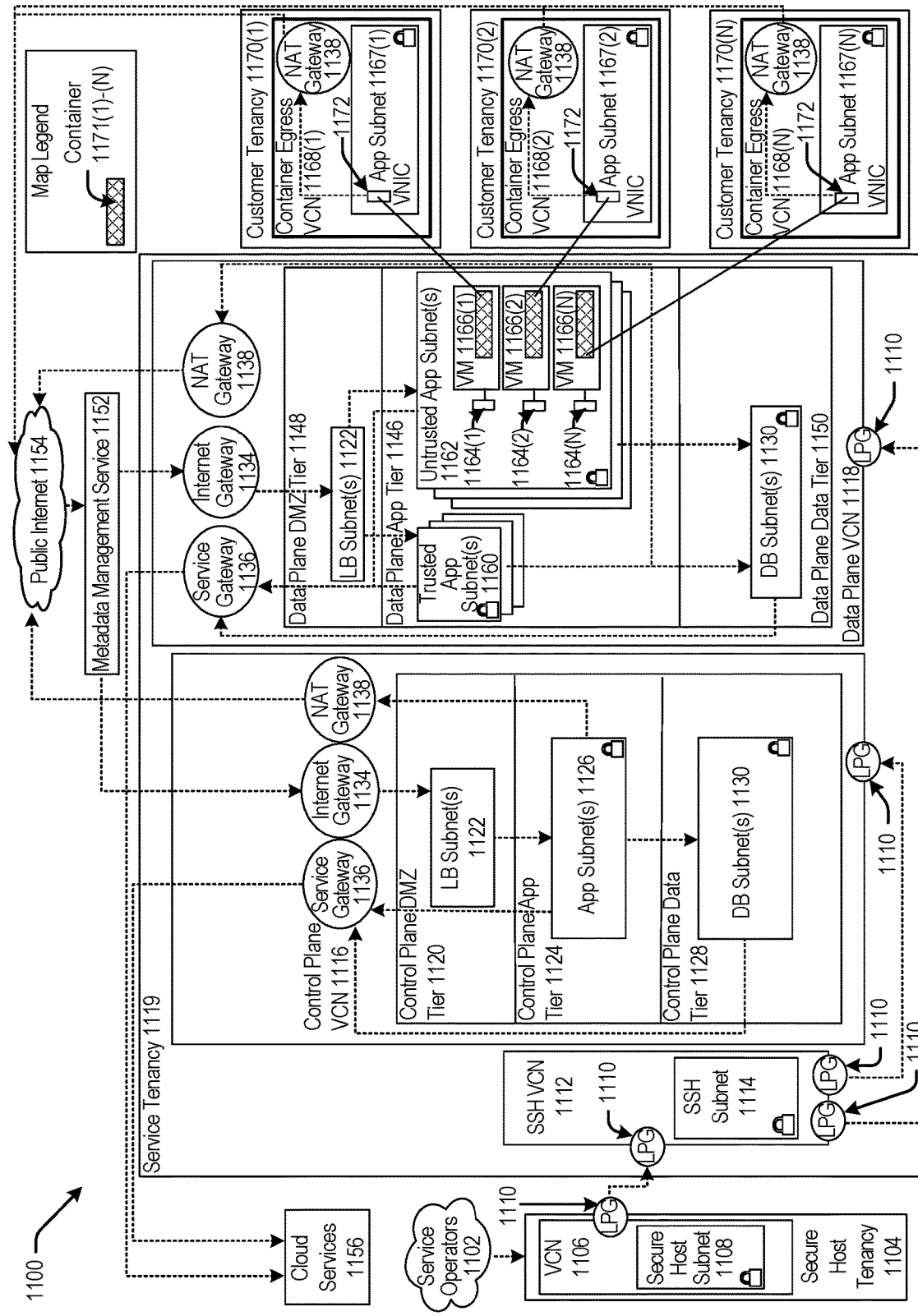
FIG. 11 is a block diagram illustrating another pattern for implementing a cloud infrastructure as a service system, according to at least one embodiment.
Figure 12:
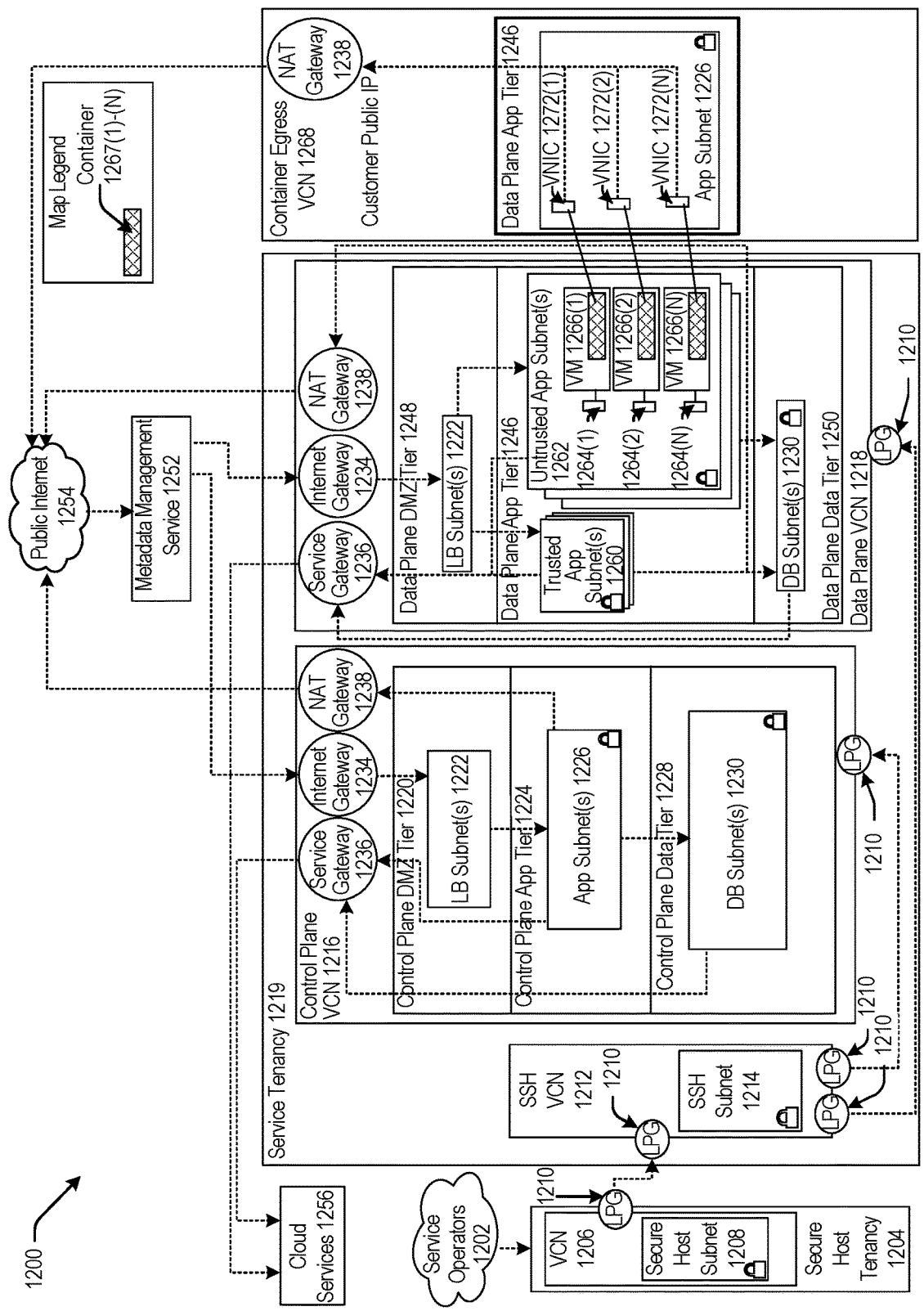
FIG. 12 is a block diagram illustrating another pattern for implementing a cloud infrastructure as a service system, according to at least one embodiment.

The present disclosure describes techniques for managing credentials for access to an infrastructure service (such as a cloud infrastructure service, e.g., the cloud infrastructure of FIG. 9, the cloud infrastructure of FIG. 10, the cloud infrastructure of FIG. 11, and/or the cloud infrastructure of FIG. 12) provided by a cloud servicer provider (CSP) and/or for performance of actions with the infrastructure service. More particularly, to be granted access to a secured entity within the infrastructure service, the secured entity may check credentials to determine whether the actor is authorized to perform actions with the secured entity. The infrastructure service, or a portion thereof, may coordinate with the secured entity and a client device to produce a credential for the client device. The infrastructure service, or portion thereof, may maintain the credential rather than providing the credential to the client device. The infrastructure service, or portion thereof, may utilize the credential to perform on actions requested by the client device on behalf of the client device without the client device having access to the credential. Accordingly, the credential may remain within a trusted environment without being provided to an untrusted environment, such as the client device.

A CSP may provide a variety of services to clients on demand using different systems and infrastructure services (referred to herein as cloud infrastructure service). In certain embodiments, a CSP may provide services under an Infrastructure-as-a-Service (IaaS) model, wherein the CSP provides infrastructure services that can be used by client to build their own networks and deploy customer resources. The CSP-provided infrastructure may include interconnected high-performance computer resources including various host machines (also referred to as hosts), memory resources, and network resources that form a physical network, which is referred to as a substrate network or an underlay network. The CSP-provided infrastructure may be spread across one or more data centers that may be geographically spread across one or more regions.

The physical network of the CSP, which may include the various host machines, memory resources, and/or network resources, may provide the underlying basis for creating one or more virtual or overlay networks on top of the physical network. These virtual or overlay networks (also referred to as software-based or software-defined networks) may be implemented using software virtualization technologies to create layers of network abstraction that can be run on top of the physical network. Overlay networks can take on many forms. Overlay networks may use Layer-3 IP addressing with endpoints designated by their virtual IP addresses. This method of overlay networking is often referred to as virtual Layer 3 networking.

When a client subscribes to or registers for an IaaS service provided by a CSP, a tenancy may be created for that client, where the tenancy is a secure and isolated partition within the CSP's infrastructure service where the client can create, organize, and administer their cloud resources. For example, a client can use resources provided by the CSP to build one or multiple customizable and private virtual network(s) referred to as virtual cloud networks (VCNs) within the client's tenancy. One or more client resources, such as compute instances (e.g., virtual machines, bare metal instances, etc.) can be deployed on these client VCNs.

When a client attempts to access the infrastructure service to establish a tenancy or perform another action, the client may transmit a request to the infrastructure service requesting to establish the tenancy or perform the other action. The infrastructure service may receive the request and determine that the client is requesting the infrastructure service to perform an action with a secured entity within the infrastructure service. Based on the action, the infrastructure service may generate a credential associated with the client that provides access to the secured entity. The infrastructure service may utilize the credential to perform the requested action on behalf of the client without providing the credential to the client. Accordingly, the credential may remain in the infrastructure service providing protection for the credential.

Figure 1:
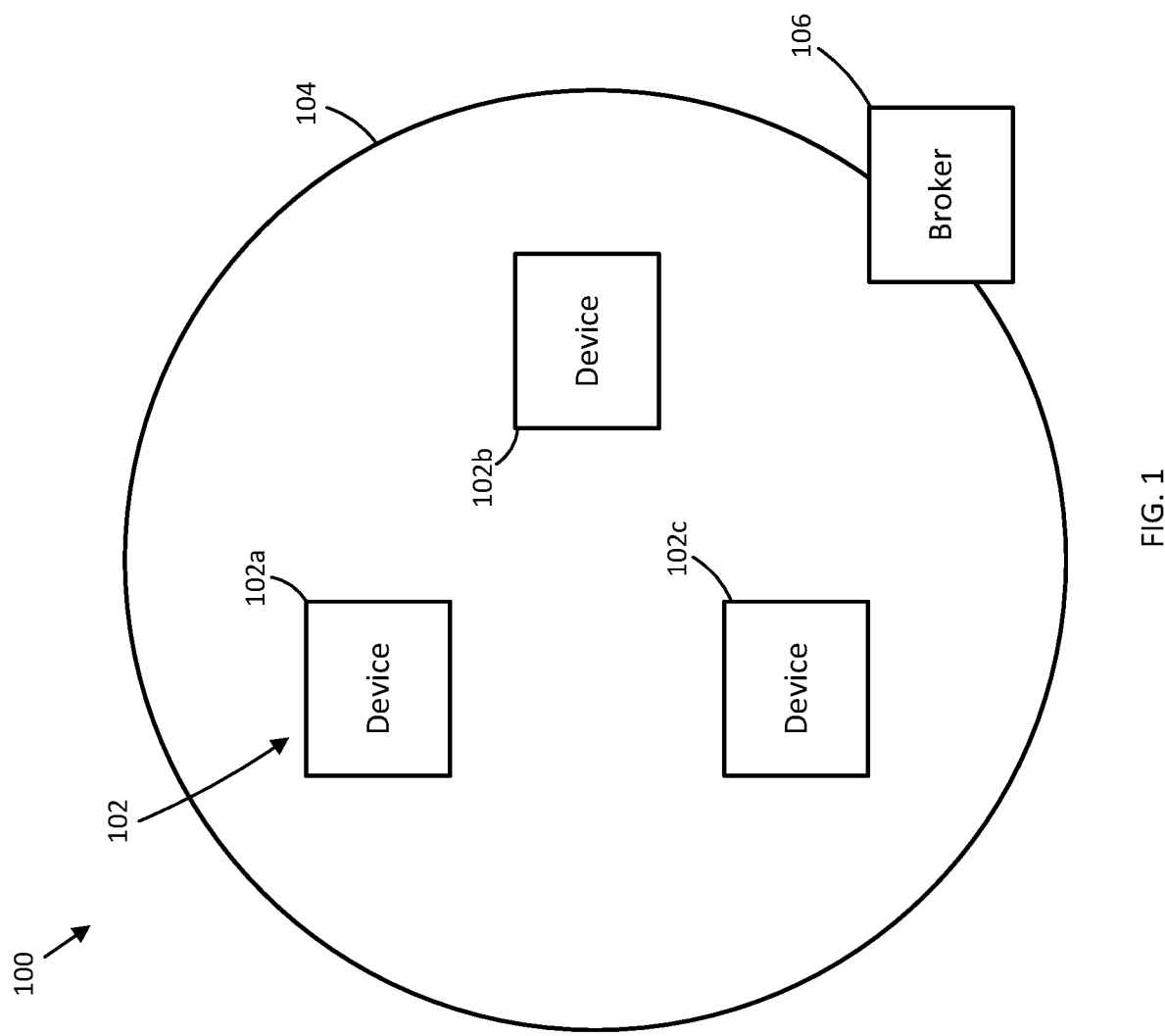
FIG. 1 illustrates an example infrastructure service arrangement in accordance with some embodiments.

FIG. 1 illustrates an example infrastructure service arrangement 100 in accordance with some embodiments. In particular, the infrastructure service arrangement 100 illustrates a portion of an infrastructure service that may implement one or more of the approaches for maintaining credentials described throughout the disclosure. In some embodiments, the infrastructure service may include one or more of the features of the cloud infrastructure of FIG. 9, the cloud infrastructure of FIG. 10, the cloud infrastructure of FIG. 11, and/or the cloud infrastructure of FIG. 12. The infrastructure service may comprise a computing system. In some embodiments, the infrastructure service may comprise a cloud computing system. The infrastructure service may include hardware and/or software of the infrastructure that can provide services for a client.

The infrastructure service may include one or more devices 102 that are communicatively coupled to provide a portion of the infrastructure service. For example, the infrastructure service arrangement 100 includes a first device 102a, a second device 102b, and a third device 102c in the illustrated embodiment. The devices 102 may comprise computing devices, such as computer terminals, servers, other computer devices, or some combination thereof. The devices 102 may communicate with each other to form a portion of the infrastructure service, where the infrastructure service may provide infrastructure services such as cloud infrastructure services.

The devices 102 may be grouped into different enclaves. For example, the first device 102a, the second device 102b, and the third device 102c may form part of an enclave 104 of the infrastructure service. Each of the enclaves of the infrastructure service may form its own secured entity, or may be part of a secured entity that includes multiple enclaves. The enclave 104 may perform particular operations. For example, the enclave 104 may comprise a management enclave that provides management operations, a service enclave that provides service operations, or a customer enclave that provide customer operations to the client. The enclave 104 may implement a software-defined perimeter (SDP) security model to create a protected IaaS instance. The enclave 104 may have a SDP defined that includes one or more devices (such as the first device 102a, the second device 102b, and the third device 102c) and/or certain software, where an edge of the enclave 104 is defined by the separation of the devices and/or software from elements outside of the enclave 104. The enclave 104 may have a unique communication profile, which may be different from other communication profiles of different enclaves in the infrastructure service. Access into and out of the enclave 104 may be controlled, monitored, and/or policy driven. For example, access to the enclave 104 may be based on authorization, where access to the enclave 104 may be limited to authorized clients. The enclave 104 may determine authorization for access to the enclave 104 based on one or more credentials provided to the enclave 104.

The infrastructure service may include one or more security brokers, such as the broker 106. The broker 106 may comprise a device, software, or some combination thereof. The broker 106 may be located at the edge of the enclave 104. For example, broker 106 may be located at the edge of the enclave 104 to allow communication with the broker 106 without accessing secure portions of the enclave 104.

The broker 106 may receive a registration request from the client. The registration request may include an identifier for the client, where the broker 106 may utilize the identifier to determine that requests received in the future are from the client. In some embodiments, the identifier may comprise a key (such as a public key) corresponding to the client. The broker 106 may store the identifier received from the client to be utilized for identifying the client in the future.

In some instances, the registration request may further include an indication of a subscriber for which the client is requesting association. For example, a subscriber to the infrastructure service may have previously established a tenancy within the infrastructure service. The client may indicate that they are to be associated with the subscriber and are to operate with the tenancy generated by the subscriber. The broker 106 may perform authentication and/or authorization procedures to verify that the client is authorized to be associated with the subscriber and operate with the tenancy generated by the subscriber. If the broker 106 determines that the client is authorized to be associated with the subscriber, the broker 106 may allow the client to operate with the tenancy associated with the subscriber. In some other instances, the broker 106 may operate with another portion of the infrastructure service to generate a tenancy for the client based on the registration request. In instances where the broker 106 generates the tenancy for the client based on the registration request, the client may act as the subscriber to the infrastructure service.

After registration of the client, or in addition to the registration of the client, the client may transmit a request for the infrastructure service to perform an action. The broker 106 may receive the request and determine that the client is requesting the action based on the identifier of the client included with the request. The broker 106 may determine whether the client is authorized for performance of the action by the infrastructure service. For example, the broker 106, or another portion of the infrastructure service, may maintain a group of one or more actions or types of actions that the subscriber is authorized to perform with the infrastructure service or a group of one or more actions or types of actions, that the subscriber has authorized the client to perform with the infrastructure service. The broker 106 may compare the action requested with the authorized actions or types of actions for the client to determine whether the requested action corresponds to the authorized actions or types of actions. If the broker 106 determines that the requested action does not correspond to the authorized actions or types of actions, the broker 106 may prevent the action for being performed for the client. If the broker 106 determines that the requested action does correspond to the authorized actions or types of actions, the broker 106 may continue towards performance of the operation.

Based on the action, the broker 106 may determine which service of the infrastructure service is to be utilized to perform the requested action for the client. For example, the broker 106 may determine that the action is to be performed by a service within the enclave 104. The broker 106 may coordinate with the enclave 104 to generate a credential for access to the enclave 104. In some embodiments, the credential may be a token, a key, or some combination thereof. Further, the credential may be signed by the enclave 104 in some embodiments. The credential may be presented to the enclave 104 for the enclave 104 to determine whether to provide access to the requestor. In some embodiments, the broker 106 may send a request to the enclave 104 for generation of the credential. The request for generation of the credential may include the identifier of the client in some embodiments. The enclave 104 may respond to the request with a key (which may be referred to as a "proof key" herein) to be utilized by the broker 106 for generation of the credential. The broker 106 may utilize the proof key to generate the credential for access to the enclave 104. For example, the broker 106 may generate the credential based on the proof key and the identifier of the client in some embodiments. In some instances, the broker 106 may have previously received the proof key from the enclave 104 and the broker 106 may utilize the previously received proof key to generate the credential rather than requesting the proof key at the time of the request.

Once generated, the broker 106 may store the credential. For example, the broker 106 may store the credential with association to the client, such as the credential being stored by the broker 106 with association to the identifier of the client. In contrast to legacy approaches, the broker 106 may maintain the credential separate from the client. In particular, the broker 106 may not provide the credential to the client. Accordingly, the credential may remain stored by the broker 106 rather than being provided to the client for storage. The broker 106 and the enclave 104 may be part of a trusted environment, where the operator of the infrastructure service may manage the security of the trusted environment and have a higher trust in the security of data managed in the trusted environment. The client may be separate from the trusted environment, where the client may be managed by a party separate from the operator of the infrastructure service and the operator of the infrastructure service may not manage the security of the client. Due to the client being separate from the trusted environment, there could be a higher chance that a bad actor (which may include the client) could utilize a credential provided to the client, and/or derive the proof token from the credential provided to the client, for performance of an unauthorized action with the infrastructure service than when the credential is maintained within the trusted environment.

In some embodiments, the broker 106 may store the credential with association to the actions or types of actions for which the client has authorization. For example, the broker 106 may identify the actions or types of actions for which the client has authorization, such as the actions or types of actions for which the corresponding subscriber has provided the client authorization. The broker 106 may store the credential with an indication of the actions or types of actions for which the client has authorization. The broker 106 may then limit use of the credential to actions or types of actions for which the client has authorization. Limiting the use of the credential to actions or types of actions for which the client has authorization can be in contrast to the legacy approaches where the credential is provided to the client. In particular, the credential provided to the client in legacy approaches could provide the client access to the enclave 104 without limiting the actions the client could perform with the enclave 104. By the broker 106 limiting the use of the credential to actions or types of actions, the broker 106 may prevent the client from performing unauthorized actions with the enclave 104 using the credential, whereas the legacy approaches of providing the credential to the client would not prevent the client from performing unauthorized actions with the enclave 104 using the credential.

The broker 106 may then utilize the credential to perform the action requested by the client. In particular, the broker 106 may perform the action with the enclave 104 on behalf of the client rather than the client performing the action with the enclave 104. For example, the broker 106 may provide the request for the action requested by the client to the enclave 104 with the credential providing access to the enclave 104. The services within the enclave 104 may perform the action and respond to the broker 106 with the result of the action. The broker 106 may forward the result of the action to the client after the action has been performed. Having the broker 106 perform the action on behalf of the client rather than the client performing the action with the enclave 104 may prevent unauthorized actions being performed by the client. For example, when the client can perform the action with the enclave 104, the client may receive authorization for performance of one action and then request that the enclave 104 perform a different action. The broker 106 may maintain the same requested action for both the authorization of the action and the performance of the action, thereby preventing the action from being changed out between the authorization and the performance.

Once the action has been completed and/or the client ends a session with the broker 106, the broker 106 may delete the credential from storage in some embodiments. For example, the broker 106 may determine that the action has been completed and/or the client ends a session. A session may end between the broker 106 and the client based on the client signing out with the broker 106, a connection between the broker 106 and the client being terminated, or some combination thereof. Based on the determination that the action has been completed and/or the client ending the session, the broker 106 may delete the credential. Therefore, the credential may be ephemeral in some embodiments. If a bad actor does manage to gain access to the broker after the action has been completed and/or the client ends the session, the broker 106 will no longer have the credential and the bad actor will be unable to steal the credential that provides access to the enclave 104.

While the infrastructure service arrangement 100 illustrates an embodiment of a portion of infrastructure service, it should be understood that other embodiments of infrastructure services having the features of the infrastructure service arrangement 100 are to be covered by the disclosure. For example, enclaves (such as the enclave 104) may be formed by one or more devices and/or one or more devices may be included in multiple enclaves. Further, the infrastructure service may include multiple enclaves rather than the single enclave illustrated. Each enclave may further include multiple security elements where each of the security elements may be accessed by any of the clients, each of the security elements may be dedicated to a corresponding client such that the corresponding client may access the corresponding security element, or some combination thereof.

Further, while the enclaves of the infrastructure service arrangement 100 are described as the secured entities in the illustrated embodiment, it should be understood that secured entities may be different parts of the infrastructure service arrangement 100 in other embodiments. For example, a secured entity of an infrastructure service arrangement 100 may be any portion of the infrastructure service arrangement 100 that requires a credential for access. Additionally, while the broker 106 is shown as a stand-alone element in the illustrated embodiment, it should be understood that the broker 106 may be include in or combined with one or more elements in other embodiments, such as being combined with a security element.

Figure 2:
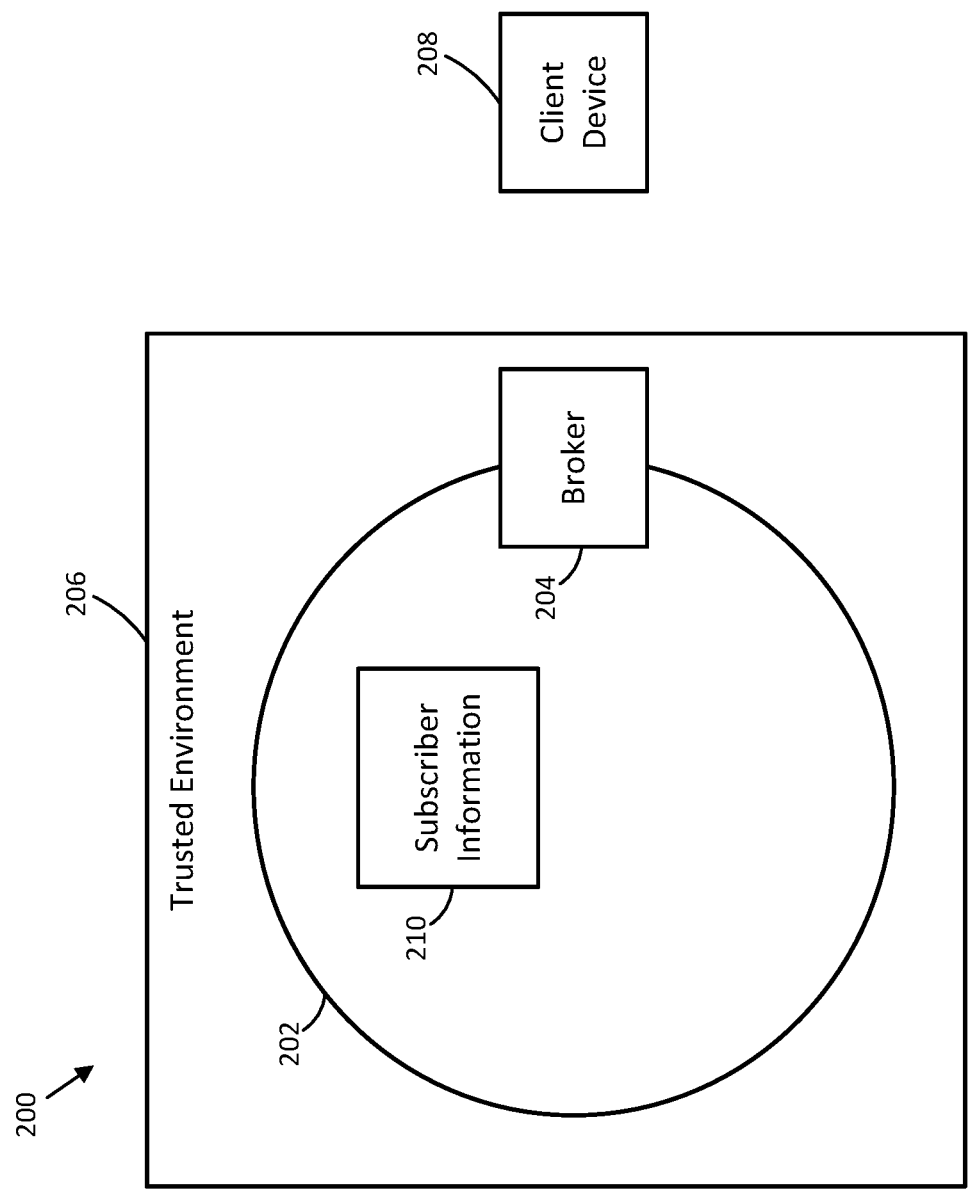
FIG. 2 illustrates an example access arrangement in accordance with some embodiments.

FIG. 2 illustrates an example access arrangement 200 in accordance with some embodiments. For example, the access arrangement 200 illustrates an example layout of devices for illustrating the approach of an authorizing broker in accordance with some embodiments. It should be understood that the access arrangement 200 is a single embodiment used to illustrate the approach and implementation of the approach is not limited to the example layout illustrated.

The access arrangement 200 may include an enclave 202. The enclave 202 may include one or more of the features of the enclave 104 (FIG. 1). The enclave 202 may comprise an infrastructure service, or a portion thereof, such as the infrastructure service described in relation to FIG. 1. The infrastructure service may comprise a computing system, such as a cloud computing system, in some embodiments.

The access arrangement 200 may further include a broker 204. The broker 204 may include one or more of the features of the broker 106 (FIG. 1). The broker 204 may correspond to the enclave 202, and may access to the enclave 202 and performance of actions by the enclave 202. The broker 204 may be located at an edge of the enclave 202 to allow communication with the broker 204 without providing access to secure portions of the enclave 202.

The enclave 202 and the broker 204 may be operated within a trusted environment 206. The trusted environment 206 may be defined as an environment over which an operator of the infrastructure service has control. For example, the operator of the infrastructure service may have exclusive control of the trusted environment 206. The operator may control the security for the trusted environment 206, where the security may allow only the operator and/or selected user to access the trusted environment 206. The operator having control of the trusted environment 206 may provide for greater trust in the data stored within the trusted environment 206 than if users not specifically indicated by the operator could access the trusted environment 206. The trusted environment 206 may include particular hardware, particular software, or some combination thereof. Limited access may be provided to the trusted environment 206.

The access arrangement 200 may further include a client device 208. The client device 208 may comprise a single device, another infrastructure service, or a cloud computing system. The client device 208 may be maintained by a separate operator from the trusted environment 206. The client device 208 may communicate with elements (such as the broker 204) within the trusted environment 206 via a network, such as the internet. The client device 208 may be able to request services to be provided by the enclave 202. A user may access the client device 208 to request services from the enclave 202. For example, the user may be an individual that can sign into the client device 208, where the user signing into the client device 208 may verify an identity of the user.

The client device 208 may request registration with the infrastructure service and/or the enclave 202. For example, the client device 208 may transmit a registration request that includes an identifier of the client device 208 and/or the user. The registration request may further include an indication of a subscriber for which the client device 208 requests association in some instances. The broker 204 may receive the registration request from the client device 208. The broker 204 may store the identifier of the client device 208 and/or the user in association with the client device 208 and/or the user. In instances where the registration request includes the indication of a subscriber, the broker 204 may further determine whether the client device 208 and/or the user has authorization for the subscriber. For example, the enclave 202 may have subscriber information 210 related to one or more subscribers stored in the enclave 202. In other embodiments, the subscriber information 210 may be stored in the broker 204 or another portion of the infrastructure service. The broker 204 may obtain the subscriber information associated with the subscriber indicated in the registration request from the subscriber information 210 and determine whether the subscriber provided authorization for the client device 208 and/or the user. If the broker 204 determines that the subscriber provided authorization for the client device 208 and/or the user, the broker 204 may store the identifier of the client device 208 and/or the user in association with the subscriber.

In other instances, the client device 208 may act as a subscriber, where the registration request may not include the indication of the subscriber and subscriber information for the client device 208 and/or user may be stored in the subscriber information 210. The subscriber information for the client device 208 and/or the user may include indication of other client devices and/or users that can be associated with the subscriber as well as actions or types of actions that can be performed in association with the subscriber.

The client device 208 may further request one or more actions to be performed by the infrastructure service. For example, the client device 208 may transmit a request for performance of the actions to the infrastructure service, where the request may include an identifier of the client device 208 and/or the user. The broker 204 may receive the request from the client device 208. The broker 204 may identify the identifier of the client device 208 and/or the user and the actions being requested by the client device 208 from the request. Based on the identifier and the actions, the broker 204 may determine whether the client device 208 is authorized for performance of the actions. For example, the broker 204 may identify a subscriber with which the client device 208 is associated based on the identifier. The broker 204 may then determine which actions or types of actions have been authorized for the client device 208 by the subscriber. The broker 204 may determine whether the actions requested by client device 208 correspond to the actions and/or the types of actions for which the client device 208 has authorization. If the broker 204 determines that the actions requested by the client device 208 do not correspond to the actions and/or the types of actions for which the client device 208 has authorization, the broker 204 may prevent the actions from being performed without sharing information about the infrastructure service to the client device 208.

If the broker 204 determines that the actions requested by the client device 208 correspond to the actions and/or the types of actions for which the client device 208 has authorization, the broker 204 may proceed toward performance of the actions. For example, the broker 204 may coordinate with the enclave 202 to generate a credential for accessing the enclave 202. The broker 204 may transmit a request to the enclave 202 for generation of the credential. The request for generation of the credential may include the identifier for the client device 208 and/or the user in some embodiments. The enclave 202 may respond to the request with a key to be utilized by the broker 204 for generation of the credential. The broker 204 may utilize the key to generate the credential. In some embodiments, the broker 204 may generate the credential based on the key and the identifier of the client device 208 and/or the user. In some instances, the broker 204 may have previously received the key from the enclave 202 and the broker 204 may utilize the previously received key to generate the credential.

The broker 204 may store the credential with association to the client device 208 and/or the user. For example, the broker 204 may store the credential with association to the identifier of the client device 208 and/or the user, where the broker 204 may determine to utilize the credential for authorized action requests that include the identifier of the client device 208 and/or the user. The broker 204 may maintain the credential separate from the client device 208, where the broker does not provide the credential to the client device 208. Accordingly, the broker 204 may maintain the credential within the trusted environment 206, which may provide greater security from bad actors accessing the credential and/or deriving the key corresponding to the enclave 202 from the credential.

In some embodiments, the broker 204 may store the credential with association to the actions or types of actions for which the client device 208 has authorization. For example, the broker 204 may identify the actions or types of actions for which the client device 208 and/or the user has authorization, such as the actions or types of actions for which the corresponding subscriber has provided the client authorization. The broker 204 may limit use of the credential to actions or types of actions for which the client has authorization.

The broker 204 may utilize the credential to perform the actions requested by the client device 208. For example, the broker 204 may perform the actions with the enclave 202 on behalf of the client device 208 rather than the client device 208 performing the actions with the enclave 202. The broker 204 may provide a request for the actions requested by the client device 208 to the enclave 202 with the credential providing access to the enclave 202. The services within the enclave 202 may perform the actions based on the request for the actions. The enclave 202 may provide a result (such as acknowledgement that the action has been completed, an indication that the action failed for some reason, and/or one or more values produced by the actions) of the actions to the broker 204. The broker 204 may then provide the results of the actions to the client device 208.

In some embodiments, the broker 204 may delete the credential from storage one the actions have been completed and/or the client device 208 ends a session with the broker 204. For example, the broker 204 may determine that the actions has been completed and/or the client ends a session. A session may end between the broker 204 and the client device 208 based on client device 208 providing a request to end the session, a connection between the broker 204 and the client device 208 being terminated, or some combination thereof. The broker 204 may delete the credential based on the determination that the action has been completed and/or the session being ended.

Figure 3:
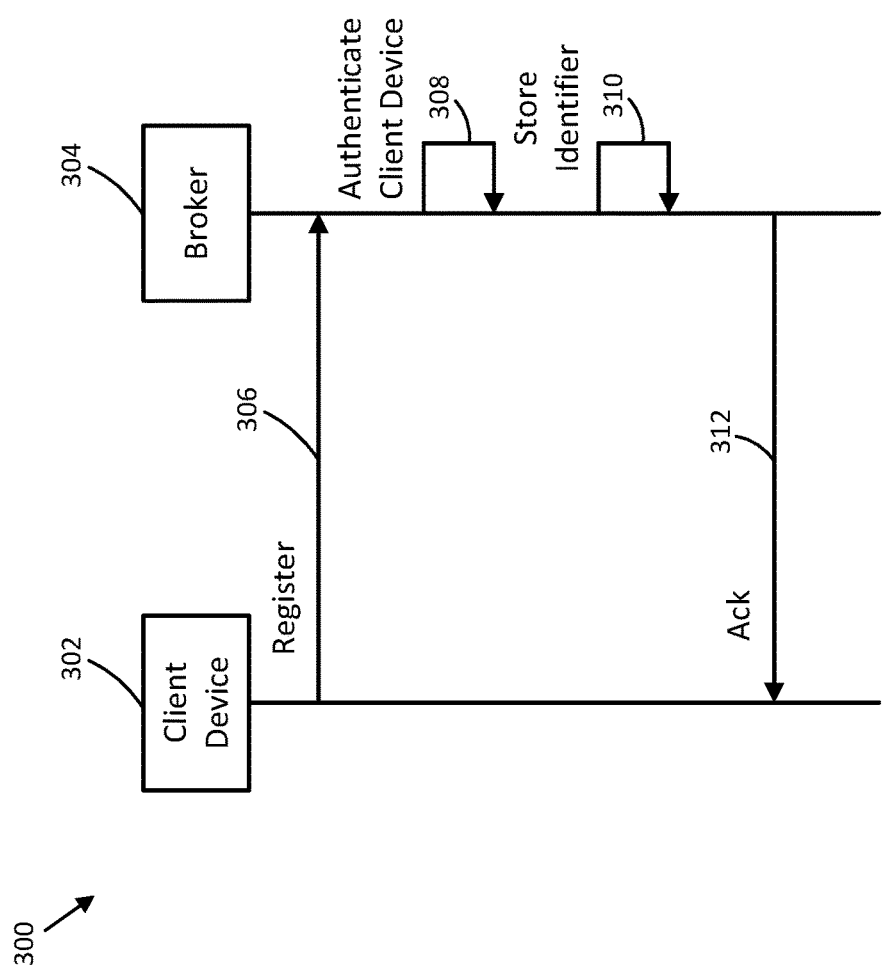
FIG. 3 illustrates an example procedure flow for client device registration in accordance with some embodiments.

FIG. 3 illustrates an example procedure flow 300 for client device registration in accordance with some embodiments. For example, the procedure flow 300 illustrates example operations that may be performed with a client device 302 and a broker 304 during registration of the client device 302 in accordance with some embodiments. The client device 302 may include one or more of the features of the client device 208 (FIG. 2). The broker 304 may include one or more of the features of the broker 106 (FIG. 1) and/or the broker 204 (FIG. 2). It should be understood that the operations illustrated are an example of an embodiment, and in other embodiments the operations may be performed in a different order, one or more of the operations may be performed concurrently, additional operations may be included in the procedure flow 300, and/or one or more of the operations may be omitted from the procedure flow 300.

To initiate the procedure flow 300, a user of the client device 302 may request the client device 302 to register with an infrastructure service (such as the infrastructure service described in relation to FIG. 1 and/or FIG. 2) that includes the broker 304. The client device 302 may transmit a registration request 306 to the broker 304 for registration with the infrastructure service. The registration request 306 may include an identifier of the client device 302 and/or the user of the client device 302. The registration request 306 may indicate to the broker 304 that the client device 302 and/or the user of the client device 302 would like to be registered with the infrastructure service. In some instances, the registration request 306 may further include an indication of a subscriber with which the client device 302 and/or the user of the client device 302 would like to be associated.

The broker 304 may receive the registration request 306 from the client device 302. The broker 304 may perform an authentication and/or an authorization procedure 308 for the client device 302 based on the registration request 306. For example, in the instances that the registration request 306 includes an indication of a subscriber with which the client device 302 and/or the user of the client device 302 would like to be associated, the broker 304 device may identify information associated with the subscriber, which may include an indication of client devices and/or users to which the subscriber provides authorization for association. The broker 304 may determine whether the client device 302 and/or the user of the client device 302 are included in the client devices and/or users to which the subscriber provides authorization based on the identifier received in the register request. In some instances, the subscriber may include one or more authentication procedures for the client device 302 to complete (such as passcode checks, token authentication, multi-factor authentication, or some combination thereof) for the client device 302 and/or the user of the client device 302 to prove their identity.

In some instances, the client device 302 may be operating as a subscriber with the registration request 306. For example, the registration request 306 transmitted by the client device 302 may be part of a procedure of the client device 302 subscribing with the infrastructure service and/or generating a tenancy with the infrastructure service. In these instances, the indication of the subscriber for association may be omitted from the registration request 306. Further, the authentication and/or authorization procedure 308 may be omitted in these instances. In these instances, the registration request 306 or another message may include information related to the subscriber, such as information regarding other client devices and/or users for which the client device 302 will grant authorization related to the subscription.

Based on the broker 304 authenticating and/or determining authorization of the client device 302, the broker 304 may store the identifier 310. For example, the broker 304 may store the identifier provided in the registration request 306 associated with the client device 302 and/or the user of the client device 302. The broker 304 may then utilize the identifier to identify transmissions from the client device 302 based on the identifier. In instances where the broker 304 determines that the client device 302 and/or the user of the client device 302 can be associated with the subscriber or the broker 304 is acting as the subscriber, the broker 304 may further associate the stored identifier with the subscriber. The broker 304 may then utilize the identifier to determine that the client device 302 and/or the user of the client device 302 can act in association with the subscriber.

The broker 304 may transmit an acknowledgement message 312 to the client device 302 at completion of the client device registration. The acknowledgement message 312 may indicate whether the client device 302 and/or the user of the client device 302 have been successfully registered. For example, the acknowledgement message 312 may indicate that the client device 302 and/or the user of the client device 302 has been successfully registered based on the identifier being stored in association with the client device 302 and/or the user of the client device 302. The acknowledgement message 312 may further indicate whether the client device 302 and/or the user of the client device 302 had been successfully associated with the subscriber. Based on the receipt of the acknowledgement message 312, the client device 302 may indicate whether the client device registration was completed successfully.

Figure 4:
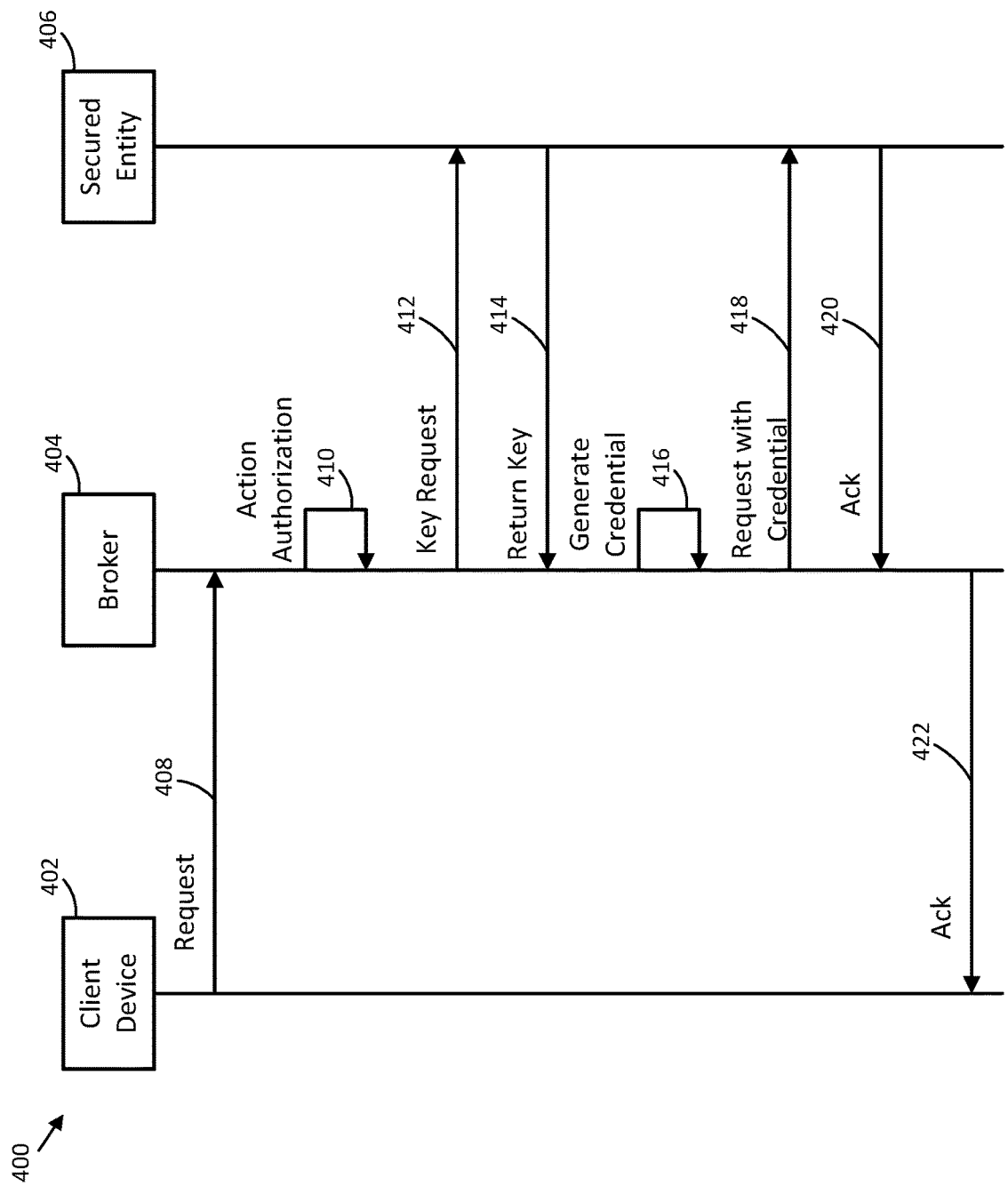
FIG. 4 illustrates an example procedure flow for action performance in accordance with some embodiments.

FIG. 4 illustrates an example procedure flow 400 for action performance in accordance with some embodiments. For example, the procedure flow 400 illustrates example operations that may be performed with a client device 402, a broker 404, and a secured entity 406 during performance of an action for the client device 402. The client device 402 may include one or more of the features of the client device 208 (FIG. 2). The broker 404 may include one or more of the features of the broker 106 (FIG. 1) and/or the broker 204 (FIG. 2). The secured entity 406 may include one or more of the features of the enclave 104 (FIG. 1), the enclave 202 (FIG. 2), and/or other secured entities described throughout the disclosure. It should be understood that the operations illustrated are an example of an embodiment, and in other embodiments the operations may be performed in a different order, one or more of the operations may be performed concurrently, additional operations may be included in the procedure flow 400, and/or one or more of the operations may be omitted from the procedure flow 400.

To initiate the procedure flow 400, the client device 402 may transmit an action request 408 to the infrastructure service. The action request 408 may indicate an action that the client device 402 is requesting the infrastructure service to perform. Further, the action request 408 may further include an identifier of the client device 402 and/or a user of the client device 402. The broker 404 may receive the action request 408 at the infrastructure service. The broker 404 may determine the action being requested by the client device 402 and/or the identifier of the client device 402 and/or the user of the client device 402 based on the action request 408.

The broker 404 may perform an action authorization 410 based on the action and the identifier determined from the action request 408. For example, the broker 404 may determine the client device 402 and/or the user of the client device 402 based on the identifier. In some instances, the broker 404 may further determine a subscriber associated with the client device 402 and/or the user of the client device 402 based on the identifier. For example, the broker 404 may have one or more identifiers stored, where the identifiers stored may indicate the client device, the user, and/or the subscriber associated with each of the identifiers. The broker 404 may determine which actions or types of actions for which the client device 402 and/or the user of the client device 402 has authorization for performance. In some instances, the actions or types of actions for which the client device 402 and/or the user of the client device 402 are authorized may be defined by the subscriber that the broker 404 has determined is associated with the client device 402 and/or the user of the client device 402. The broker 404 may compare the action requested by the client device 402 in the action request 408 with the actions and/or types of actions for which the client device 402 and/or the user of the client device 402 to determine whether the client device 402 and/or the user of the client device 402 has authorization for the action. If the broker 404 determines that the client device 402 and/or the user of the client device 402 does not have authorization for the action, the broker 404 may prevent performance of the action. If the broker 404 determines that the client device 402 and/or the user of the client device 402 has authorization for the action, the broker 404 may proceed to performance of the action.

Based on the broker 404 determining that the client device 402 and/or the user of the client device 402 has authorization for performance of the action, the broker 404 may transmit a key request 412 to the secured entity 406. The key request 412 may request a key from the secured entity 406 to be utilized for generation of a credential used for accessing the secured entity 406. In some embodiments, the key request 412 may include an indication of the client device 402 and/or the user of the client device 402, an indication of the subscriber (such as an indication of a tenancy associated with the subscriber) associated with the client device 402 and/or the user of the client device 402, or some combination thereof.

The secured entity 406 may receive the key request 412 from the broker 404. In some embodiments, the secured entity 406 may validate the client device 402 and/or the user of the client device 402, the subscriber, or some combination thereof. For example, the secured entity 406 may verify that the subscriber, the client device 402, and/or the user of the client device 402 is authorized to access secured entity 406. The secured entity 406 may return a key 414 to the broker 404 in response to the key request 412. In some embodiment, the secured entity 406 may return the key 414 further based on secured entity 406 verifying the subscriber, the client device 402, and/or the user is authorized to access the secured entity 406. In some embodiments, the secured entity 406 may indicate a validity time for which the key may be valid for use for accessing the secured entity 406. The key may be utilized for access to the secured entity 406. In some instances, the secured entity 406 may have previously provided to the key to the broker 404, in which case the key request 412 and the return of the key 414 may be omitted from the procedure flow 400.

The broker 404 may receive the key from the secured entity 406. The broker 404 may store the key for generation of credentials that provide access to the secured entity 406. The broker 404 may generate a credential 416 for the client device 402 for access to the secured entity. In some embodiments, broker may generate the credential based on the identifier for the client device 402 and/or the user of the client device 402, the subscriber (such as the tenancy), or some combination thereof. The broker 404 may store the credential to be utilized for accessing the secured entity 406 for performance of actions associated with the client device 402.

The broker 404 may transmit an action request with the credential 418 to the secured entity 406. The broker 404 may request the secured entity 406 to perform the action requested by the client device 402 in the action request 408. The secured entity 406 may receive the action request from the broker 404. The secured entity 406 may determine that access to the secured entity 406 is to be granted based on the credential. The secured entity 406 may perform the action based on the action request and on the credential. As the broker 404 requests the action and the secured entity 406 performs the action in response to the request from the broker 404, the broker 404 may have caused the action to be performed on behalf of the client device 402. As the broker 404 accesses the secured entity 406 rather than the client device 402, the broker 404 may store the credential without having to provide the credential to the client device 402 for performance of the action. Having the credential being stored separate from the client device 402 may maintain the credential in a trusted environment that includes the broker 404 and the secured entity 406, which may provide protection against bad actors obtaining the credential and/or deriving the key from the credential.

The secured entity 406 may provide an acknowledgement message 420 to the broker 404. In instances where the secured entity 406 completed the action requested by the broker 404, the acknowledgement message 420 may indicate the action has been performed. In some instances, the acknowledgement message 420 may further include a result of the action, such as a value produced by the action. The broker 404 may receive the acknowledgement message 420 from the secured entity 406 and may store the information included in the acknowledgement message 420.

The broker 404 may provide an acknowledgement message 422 to the client device 402. In instances where the secured entity 406 completes the action and provides the acknowledgement message 420, the acknowledgement message 422 transmitted by the broker 404 to the client device 402 may include the information from the acknowledgement message 420 or may be the acknowledgement message 420 forwarded to the client device 402. In instances, where the broker 404 determines that the client device 402 is not authorized for the action, the acknowledgement message 422 may indicate to the client device 402 that the action has not been performed.

Figure 5:
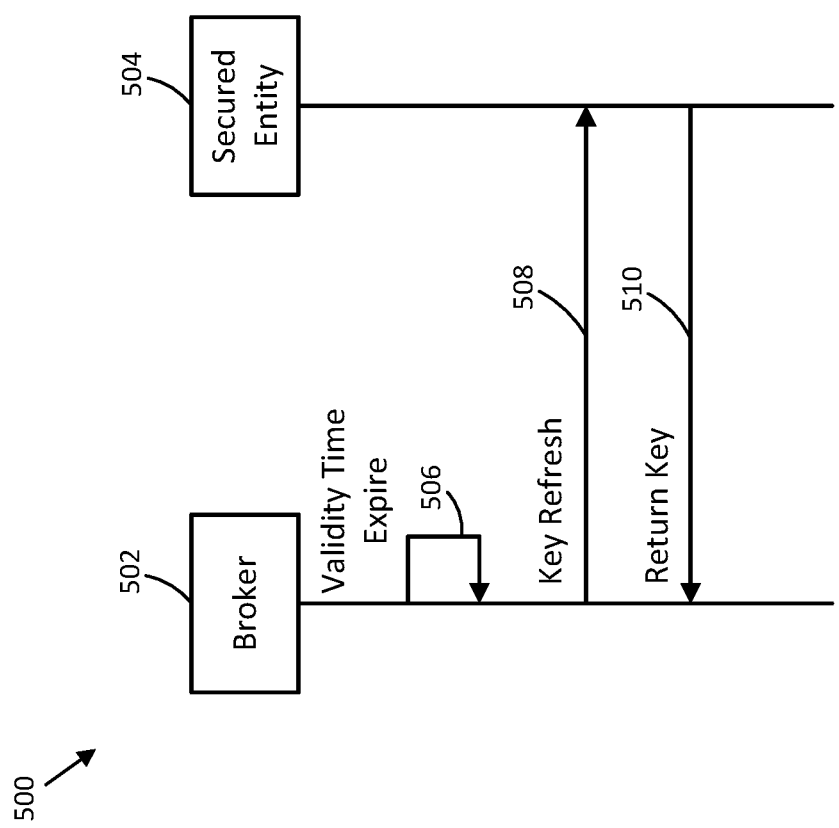
FIG. 5 illustrates an example procedure flow for key refreshment in accordance with some embodiments.

FIG. 5 illustrates an example procedure flow 500 for key refreshment in accordance with some embodiments. For example, the procedure flow 500 illustrates example operations that may be performed with a broker 502 and a secured entity 504 to refresh a key to be utilized for generating a credential for accessing the secured entity 504 in accordance with some embodiments. The key being refreshed may have been previously provided by the secured entity 504 to the broker 502, such as the key provided in the procedure flow 400 (FIG. 4). The broker 502 may include one or more of the features of the broker 108 (FIG. 1) and/or the broker 204 (FIG. 2). The secured entity 504 may include one or more of the features of the enclave 104 (FIG. 1), the enclave 202 (FIG. 2), and/or other secured entities described throughout the disclosure. It should be understood that the operations illustrated are an example of an embodiment, and in other embodiments the operations may be performed in a different order, one or more of the operations may be performed concurrently, additional operations may be included in the procedure flow 500, and/or one or more of the operations may be omitted from the procedure flow 500.

The procedure flow 500 may initiate with the broker 502 determining that a validity time for a key has expired 506. For example, when the secured entity 504 previously provided the key to the broker 502, the secured entity 504 may have indicated a validity time that the key provided would expire and/or a validity time for which the key will remain valid. The broker 502 may determine that the validity time for the key indicated by the secured entity 504 has expired.

Based on the broker 502 determining that the validity time for the key has expired, the broker 502 may transmit a key refresh request 508 to the secured entity 504. The key refresh request 508 may request a new key to be utilized for accessing the secured entity 504. In some embodiments, the key refresh request 508 may further indicate that the previously provided key has expired and/or the value of the previously provided key. The key refresh request 508 may indicate that the key requested will replace the previously provided key.

The secured entity 504 may receive the key refresh request 508 from the broker 502. The secured entity 504 may generate a new key for accessing the secured entity based on the key refresh request 508. The key may generated by the secured entity 504 may be utilized for generating one or more credentials for accessing the secured entity 504. The secured entity 504 may return the key 510 to the broker 502. In some embodiments, the secured entity 504 may further indicate a validity time for the new key along with returning the key. The broker 502 may store the key and/or the validity time for the key provided by the secured entity 504. The broker 502 may utilize the key to generate one or more credentials for accessing the secured entity 504.

Figure 6:
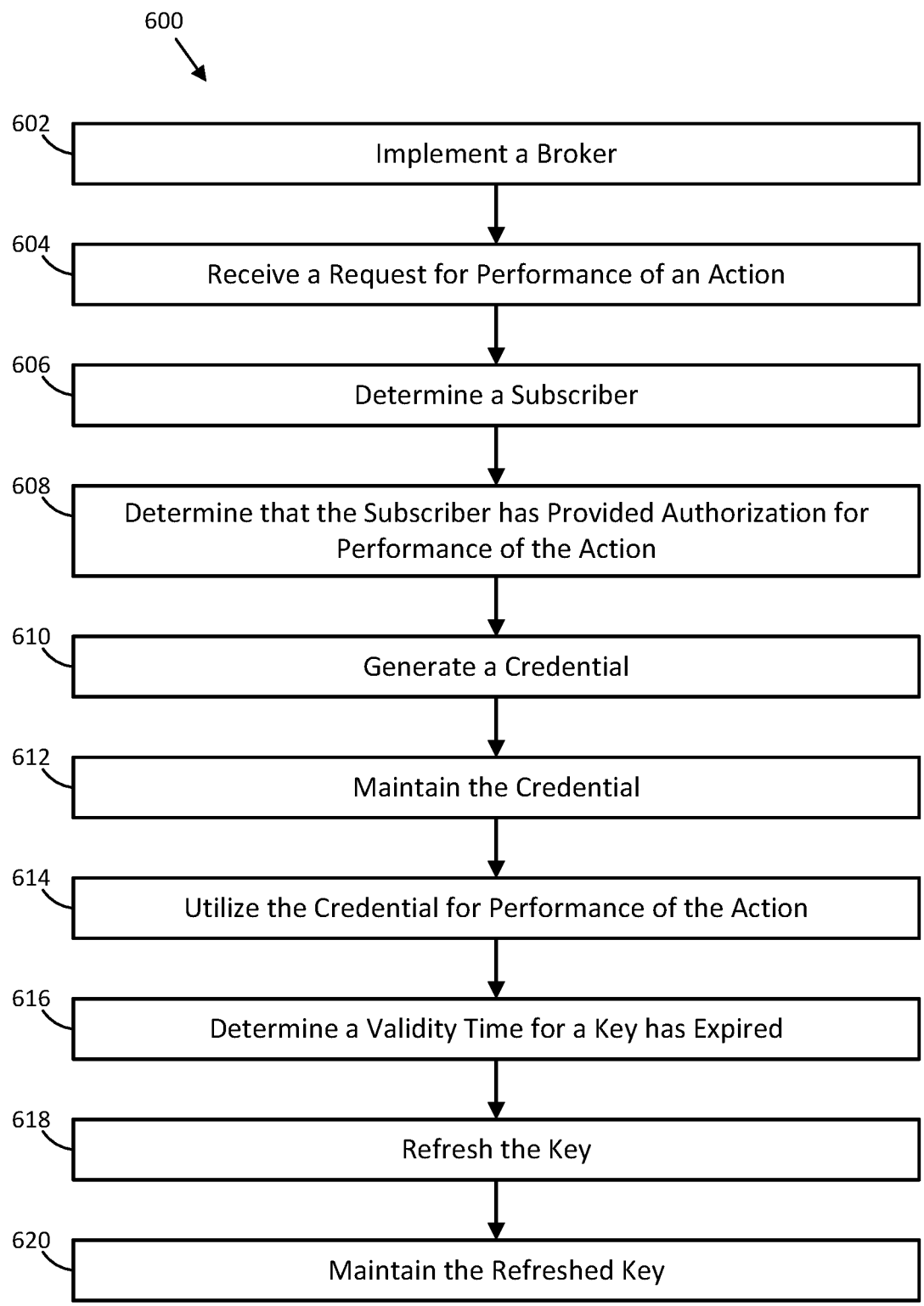
FIG. 6 illustrates an example procedure for performance of an action in accordance with some embodiments.

FIG. 6 illustrates an example procedure 600 for performance of an action in accordance with some embodiments. This process (e.g., procedure 600) is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Figure 13:
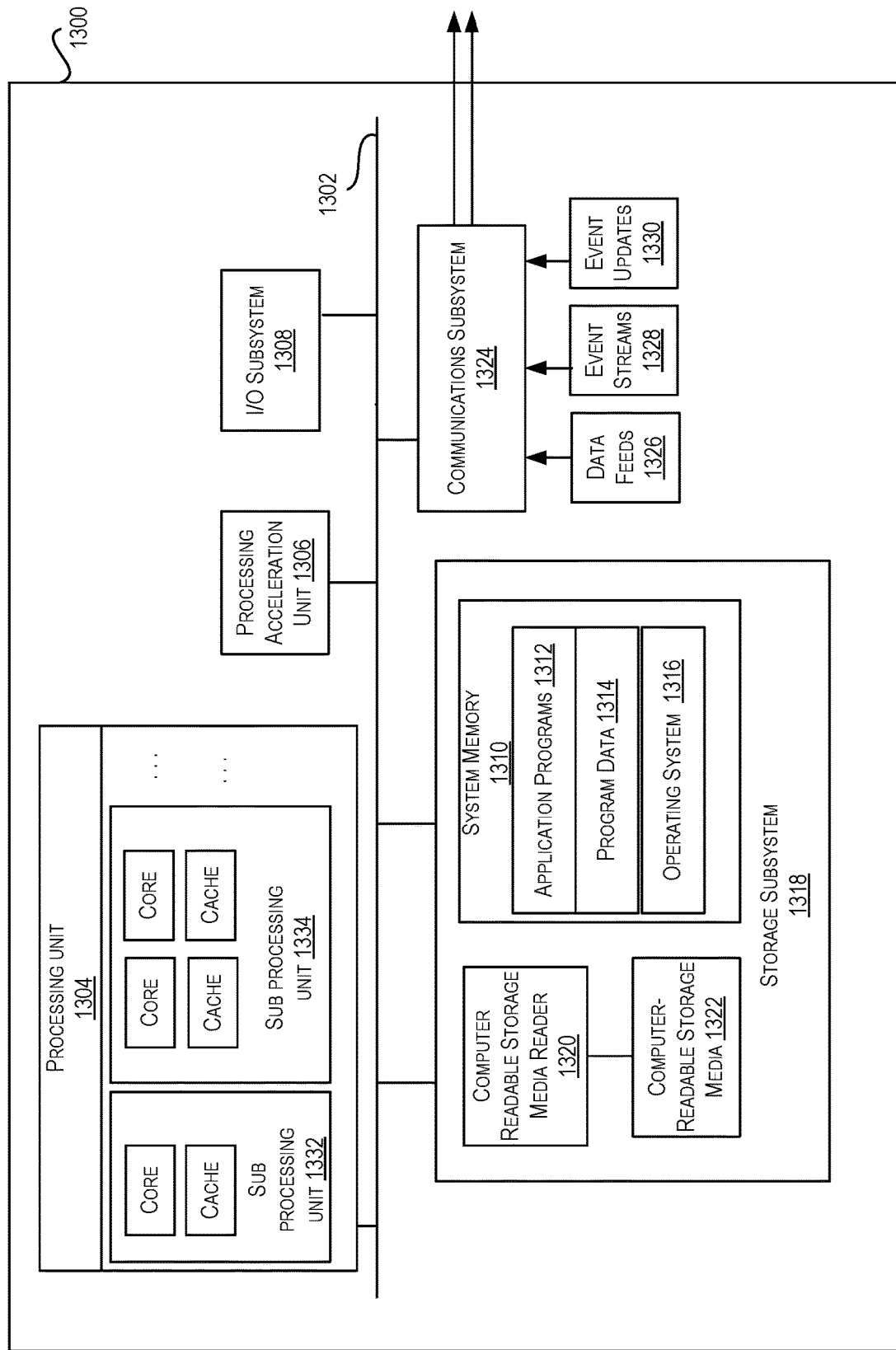
FIG. 13 is a block diagram illustrating an example computer system, according to at least one embodiment.

The procedure 600 may be performed by a broker (such as the broker 106 (FIG. 1) and/or the broker 204 (FIG. 2)) or another part of an infrastructure service (such as the infrastructure service described in relation to FIG. 1, the cloud infrastructure of FIG. 10, the cloud infrastructure of FIG. 11, the cloud infrastructure of FIG. 12, and/or the cloud infrastructure of FIG. 13, which may include a computing system, and/or a cloud computing system). The procedure 600 may be performed for performance of action requested by a client device (such as the client device 208 (FIG. 2)).

For brevity, the procedure 600 is described as being performed by a computing system herein, although it should be understood that the procedure 600 may be performed by an infrastructure service, a broker, or some combination thereof. In some embodiments, the computing system may comprise a cloud infrastructure service.

In 602, the computing system may implement a broker. For example, the computing system may implement a broker at an edge of a secured entity. In some embodiments, the secured entity may be an enclave (such as the enclave 104 (FIG. 1) and/or the enclave 202 (FIG. 2)) of the computing system. The computing system may implement the broker at the edge of the enclave in some embodiments. In some embodiments, 602 may be omitted In 604, the computing system may receive a request for performance of an action. For example, the computing system may receive a request for performance of an action from a client device. The request may include an identifier of the client device and/or a user of the client device and the action to be performed by the secured entity. In some embodiments, the action may be a request to write a billing record for a subscriber, which may indicate a number of resources that have been consumed.

In 606, the computing system may determine a subscriber. For example, the computing system may determine a subscriber corresponding to the client device based at least in part on the identifier of the client device. The computing system may store one or more identifiers and association of the identifiers with subscribers. The computing system may compare the identifier received from the client device with the stored identifiers and determine a subscriber associated with the client device based on the comparison.

In 608, the computing system may determine that the subscriber has provided authorization for performance of the action. For example, the computing system may determine that the subscriber has provided the client device authorization for performance of the action. In some embodiments, to determine that the subscriber has provided the client device authorization for performance of the action may include to determine one or more actions which the subscriber has provided authorization for the client device. The computing system may determine that the action indicated by the request is included in the one or more actions.

In 610, the computing system may generate a credential. For example, the computing system may generate a credential for access to the secured entity on behalf of the client device based at least in part on a determination that the client device has authorization for performance of the action. In some embodiments, generating the credential may include utilizing a key corresponding to the secured entity to generate the credential. The computing system may have received the key from secured entity. In some embodiments, the credential may be generated by the broker implemented in 602.

In 612, the computing system may maintain the credential. For example, the credential may maintain the credential separate from the client device. The computing system and the secured entity may be located within a trusted environment (such as the trusted environment 206 (FIG. 2)) in some embodiments. Maintaining the credential separate from the client device may include maintaining the credential within the trusted environment. In some embodiments, the broker implemented in 602 may maintain the credential separate from the client device.

In 614, the computing system may utilize the credential for performance of the action. For example, the computing system may utilize the credential for performance of the action on behalf of the client device. In some embodiments, the computing system may provide the credential to the secured entity to gain access to the secured entity. Further, the computing system may request the secured entity to perform the action. The secured entity may perform the action based on the request from the computing system. In some embodiments, the broker implemented in 602 may utilize the credential for performance of the action on behalf of the client device.

In 616, the computing system may determine that a validity time for the key has expired. For example, the computing system may determine that a validity time for the key received from the secured entity has expired. The secured entity may indicate a validity time for which the key can be utilized for generating credentials when providing the key. In some embodiments, 616 may be omitted.

In 618, the computing system may refresh the key. For example, the computing system may refresh the key with the secured entity based at least in part on the determination that the validity time for the key has expired. The computing system may provide a request for a new key from the secured entity to refresh the key. In some embodiments, 618 may be omitted.

In 620, the computing system may maintain the refreshed key. For example, the computing system may maintain the refreshed key separate from the client device. The computing system may receive the new key from the secured entity and store the new key as the refreshed key. The computing system may maintain the credential separate from the client device by maintaining the credential within the trusted environment.

Figure 7:
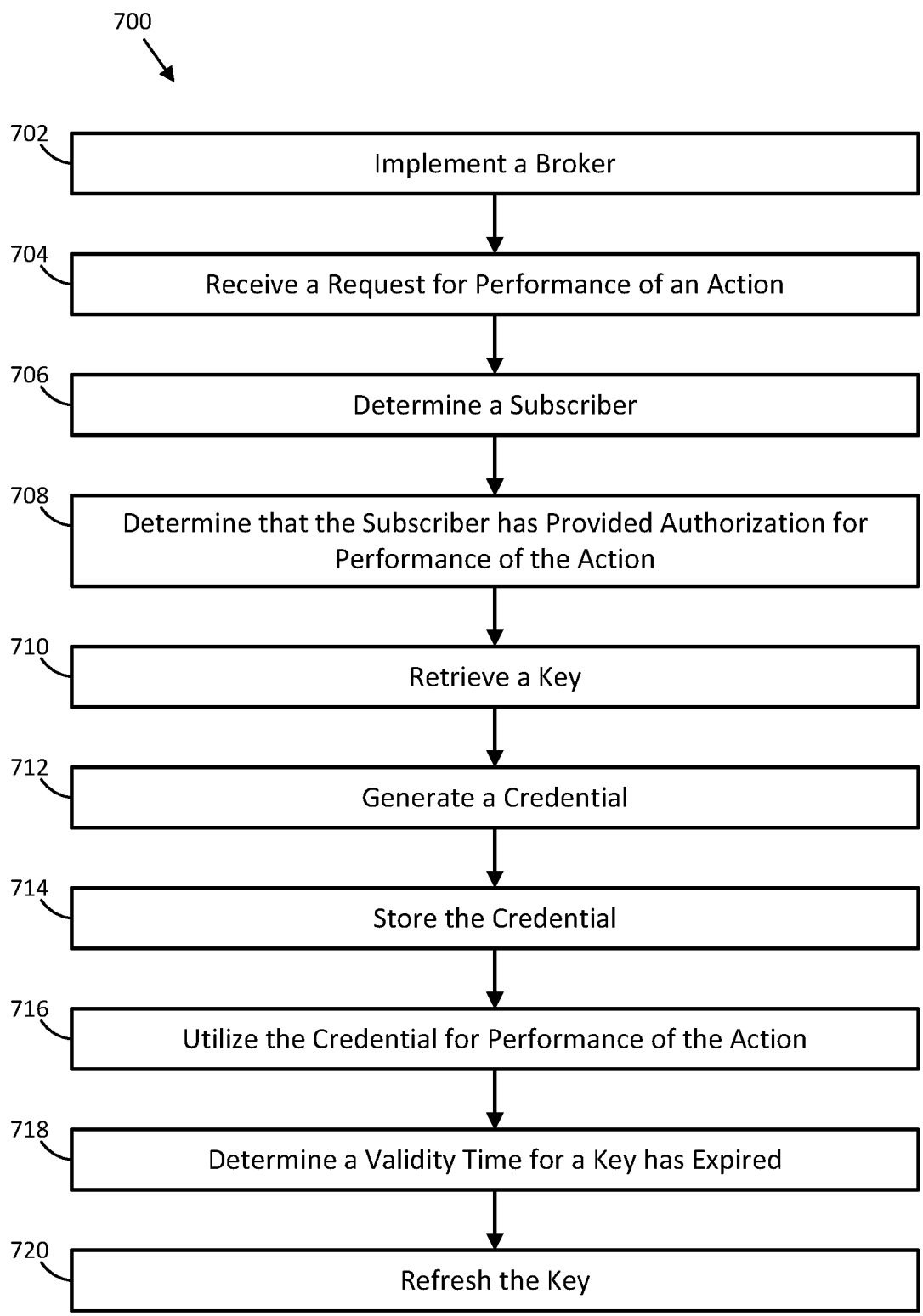
FIG. 7 illustrates another example procedure for performance of an action in accordance with some embodiments.

FIG. 7 illustrates another example procedure 700 for performance of an action in accordance with some embodiments. This process (e.g., procedure 700) is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

The procedure 700 may be performed by a broker (such as the broker 106 (FIG. 1) and/or the broker 204 (FIG. 2)) or another part of an infrastructure service (such as the infrastructure service described in relation to FIG. 1, the cloud infrastructure of FIG. 10, the cloud infrastructure of FIG. 11, the cloud infrastructure of FIG. 12, and/or the cloud infrastructure of FIG. 13, which may include a computing system, and/or a cloud computing system). The procedure 700 may be performed for performance of action requested by a client device (such as the client device 208 (FIG. 2)).

For brevity, the procedure 700 is described as being performed by a computing system herein, although it should be understood that the procedure 700 may be performed by an infrastructure service, a broker, or some combination thereof. In some embodiments, the computing system may comprise a cloud infrastructure service.

In 702, the computing system may implement a broker. For example, the computing system may comprise a cloud infrastructure service. The cloud infrastructure service may include a secured entity. In some embodiments, the secured entity may be an enclave within the cloud infrastructure service. The computing system may implement the broker at an edge of the secured entity. In some embodiments, 702 may be omitted.

In 704, the computing system may receive a request for performance of an action. For example, the computing system may receive a request for performance of an action by a secured entity, the request may be received from a client device. The request may include an identifier of the client device and/or a user of the client device and the action to be performed by the secured entity. In some embodiments, the action may be a request to write a billing record for a subscriber, which may indicate a number of resources that have been consumed.

In 706, the computing system may determine a subscriber. For example, the computing system may determine a subscriber corresponding to the client device based at least in part on an identifier of the client device. The computing system may store one or more identifiers and association of the identifiers with subscribers. The computing system may compare the identifier received from the client device with the stored identifiers and determine a subscriber associated with the client device based on the comparison.

In 708, the computing system may determine that the subscriber has provided authorization for performance of the action. For example, the computing system may determine that the subscriber has provided the client device authorization for performance of the action. In some embodiments, to determine that the subscriber has provided the client device authorization for performance of the action may include to determine one or more actions which the subscriber has provided authorization for the client device. The computing system may determine that the action indicated by the request is included in the one or more actions.

In 710, the computing system may retrieve a key. For example, the computing system may retrieve a key from the secured entity. The computing system may request the key from the secured entity based at least in part on the determination that the subscriber has provided the client device authorization for performance of the action. In some embodiments, 710 may be omitted.

In 712, the computing system may generate a credential. For example, the computing system may generate a credential for access to the secured entity based at least in part on the determination that the subscriber has provided the client device authorization for performance of the action. In some embodiments, generating the credential may include generating the credential based at least in part on the key. In some embodiments, the broker implemented in 702 may generate the credential for access to the secured entity.

In 714, the computing system may store the credential. For example, the computing system may store the credential in memory. The credential may be stored separate from the client device. The computing system and the secured entity may be located within a trusted environment (such as the trusted environment 206 (FIG. 2)) in some embodiments. Storing the credential separate from the client device may include maintaining the credential within the trusted environment.

In 716, the computing system may utilize the credential for performance of the action. For example, the computing system may utilize the credential for performance of the action on behalf of the client device. The computing system may provide the credential to the secured entity to gain access to the secured entity and may cause the secured entity to perform the action. In instances where the action is entry of a billing record, the computing system may cause the secured entity to enter the billing record. In some embodiments, the broker implemented in 702 may utilize the credential for performance of the action.

In 718, the computing system may determine that a validity time for the key has expired. For example, the computing system may determine that a validity time for the key received from the secured entity has expired. The secured entity may indicate a validity time for which the key can be utilized for generating credentials when providing the key. In some embodiments, 718 may be omitted.

In 720, the computing system may refresh the key. For example, the computing system may refresh the key with the secured entity based at least in part on the determination that the validity time for the key has expired. The computing system may provide a request for a new key from the secured entity to refresh the key. In some embodiments, 720 may be omitted.

Figure 8:
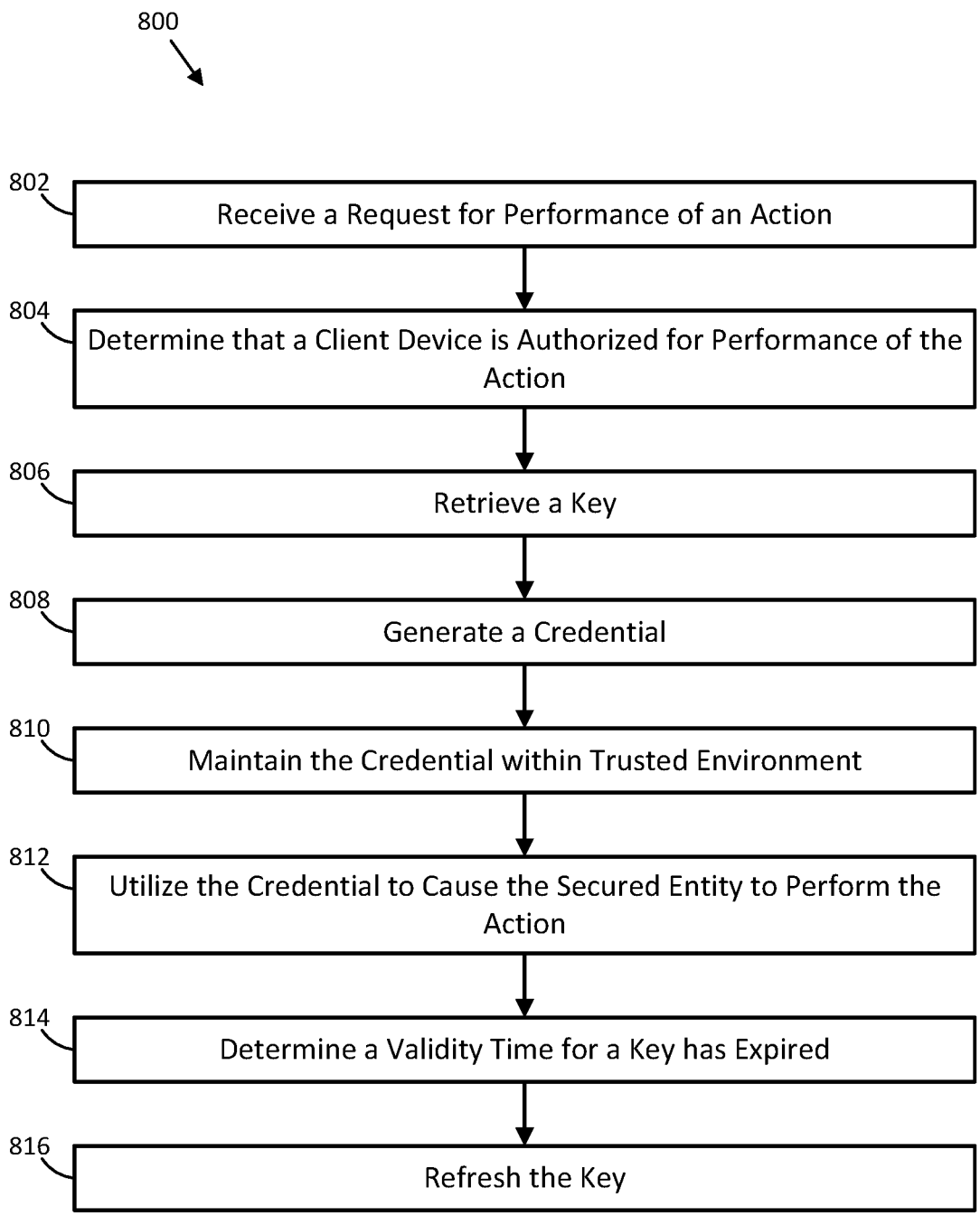
FIG. 8 illustrates another example procedure for performance of an action in accordance with some embodiments.

FIG. 8 illustrates another example procedure 800 for performance of an action in accordance with some embodiments. This process (e.g., procedure 800) is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

The procedure 800 may be performed by a broker (such as the broker 106 (FIG. 1) and/or the broker 204 (FIG. 2)) or another part of an infrastructure service (such as the infrastructure service described in relation to FIG. 1, the cloud infrastructure of FIG. 10, the cloud infrastructure of FIG. 11, the cloud infrastructure of FIG. 12, and/or the cloud infrastructure of FIG. 13, which may include a computing system, and/or a cloud computing system). The procedure 800 may be performed for performance of action requested by a client device (such as the client device 208 (FIG. 2)).

For brevity, the procedure 800 is described as being performed by a broker herein, although it should be understood that the procedure 800 may be performed by an infrastructure service, a broker, or some combination thereof. In some embodiments, the computing system may comprise a cloud infrastructure service.

In 802, the broker may receive a request for performance of an action. For example, the broker may receive, from a client device, a request for performance of an action by a secured entity. The request may include an identifier of the client device and the action to be performed by the secured entity. In some embodiments, the action may be a request to write a billing record for a subscriber, which may indicate a number of resources that have been consumed. In some embodiments, the secured entity may be an enclave. The broker may receive the request for performance of the action at an edge of the enclave.

In 804, the broker may determine that the client device is authorized for performance of the action. In some embodiments, determining that the client device is authorized for performance of the action may include determining one or more actions that the subscriber has provided authorization for the client device. The computing system may determine that the action indicated by the request is included in the one or more actions.

In 806, the broker may retrieve a key. For example, the broker may retrieve a key from the secured entity. The computing system may request the key from the secured entity based at least in part on the determination that the subscriber has provided the client device authorization for performance of the action. In some embodiments, 806 may be omitted.

In 808, the broker may generate a credential. For example, the broker may generate a credential for access to the secured entity based at least on part on the determination that the client device is authorized for performance of the action. In some embodiments, generating the credential may include generating the credential based at least in part on the key.

In 810, the broker may maintain the credential within a trusted environment. For example, the secured entity and the broker may be located within a trusted environment. The client device may be located outside of the trusted environment. The broker may maintain the credential within the trusted environment that includes the secured entity and the broker.

In 812, the broker may utilize the credential to cause the secured entity to perform the action. For example, the broker may utilize the credential to cause the secured entity to perform the action on behalf of the client device. The broker may provide the credential to the secured entity to gain access to the secured entity and may cause the secured entity to perform the action. In instances where the action is entry of a billing record, the broker may cause the secured entity to enter the billing record.

In 814, the broker may determine a validity time for the key has expired. For example, the broker may determine that a validity time for the key received from the secured entity has expired. The secured entity may indicate a validity time for which the key can be utilized for generating credentials when providing the key. In some embodiments, 814 may be omitted.

In 816, the broker may refresh the key. For example, the broker may refresh the key with the secured entity based at least in part on the determination that the validity time for the key has expired. The broker may provide a request for a new key from the secured entity to refresh the key and may receive a new key based on the request for the new key. In some embodiments, 816 may be omitted.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 636 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC 942 of FIG. 9) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136

(e.g., the service gateway 936 of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. One or more non-transitory, computer-readable media having instructions stored thereon, wherein the instructions, when executed by a computing system, cause the computing system to:
   receive a request for performance of an action from a client device, the request including an identifier of the client device and the action to be performed by a secured entity;
   determine a subscriber corresponding to the client device based at least in part on the identifier of the client device;
   determine that the subscriber has provided the client device authorization for performance of the action;
   generate a credential for access to the secured entity on behalf of the client device based at least in part on a determination that the client device has authorization for performance of the action;
   maintain the credential separate from the client device without the client device having access to the credential; and
   utilize the credential for performance of the action on behalf of the client device.

2. The one or more non-transitory, computer-readable media of claim 1, wherein the computing system and the secured entity are located within a trusted environment, and wherein to maintain the credential separate from the client device includes to maintain the credential within the trusted environment.

3. The one or more non-transitory, computer-readable media of claim 1, wherein to determine that the subscriber has provided authorization for performance of the action includes to:
   determine one or more actions which the subscriber has provided authorization for the client device; and
   determine that the action indicated by the request is included in the one or more actions.

4. The one or more non-transitory, computer-readable media of claim 1, wherein to generate the credential includes to utilize a key corresponding to the secured entity to generate the credential.

5. The one or more non-transitory computer-readable media of claim 4, wherein the instructions, when executed by the computing system, further cause the computing system to:
   determine a validity time for the key has expired;
   refresh the key with the secured entity based at least in part on the determination that the validity time for the key has expired; and
   maintain the refreshed key separate from the client device.

6. The one or more non-transitory computer-readable media of claim 1, wherein the instructions, when executed by the computing system, further cause the computing system to implement a broker at an edge of the secured entity, wherein the broker of the computing system is to generate the credential, maintain the credential separate from the client device, and utilize the credential for performance of the action on behalf of the client device.

7. The one or more non-transitory computer-readable media of claim 6, wherein the secured entity is an enclave of the computing system.

8. The one or more non-transitory computer-readable media of claim 1, wherein to utilize the credential for performance of the action includes to:
provide the credential to the secured entity to gain access to the secured entity; and
request the secured entity to perform the action.

9. A computing system, comprising:
memory to store one or more credentials; and
one or more processors coupled to the memory, the one or more processors to:
receive a request for performance of an action by a secured entity, the request received from a client device;
determine a subscriber corresponding to the client device based at least in part on an identifier of the client device;
determine that the subscriber has provided the client device authorization for performance of the action;
generate a credential for access to the secured entity based at least in part on the determination that the subscriber has provided the client device authorization for performance of the action;
store the credential in the memory, the credential being stored separate from the client device, the credential being inaccessible to the client device; and
utilize the credential for performance of the action on behalf of the client device.

10. The computing system of claim 9, wherein the one or more processors are further to retrieve a key from the secured entity, wherein to generate the credential includes to generate the credential based at least in part on the key.

11. The computing system of claim 10, wherein the one or more processors are further to:
determine that a validity time for the key has expired; and
refresh the key with the secured entity based at least in part on the determination that the validity time for the key has expired.

12. The computing system of claim 9, wherein to determine that the subscriber has provided the client device authorization for performance of the action includes to:
determine one or more actions that the subscriber has provided authorization for the client device; and
determine that the action is included in the one or more actions.

13. The computing system of claim 12, wherein the credential is associated with the one or more actions.

14. The computing system of claim 9, wherein the action comprises entry of a billing record, and wherein to utilize the credential for performance of the action includes to:
provide the credential to the secured entity to gain access to the secured entity; and
cause the secured entity to enter the billing record.

15. The computing system of claim 9, wherein the computing system comprises a cloud infrastructure service, wherein the secured entity comprises an enclave within the cloud infrastructure service, wherein the one or more processors are further to implement a broker at an edge of the enclave, and wherein the broker of the computing system is to generate the credential for access to the secured entity and utilize the credential for performance of the action.

16. A method for performing an action with a secured entity, comprising:
receiving, by a broker from a client device, a request for performance of an action by the secured entity;
determining, by the broker, that the client device is authorized for performance of the action;
generating, by the broker, a credential for access to the secured entity based at least in part on the determination that the client device is authorized for performance of the action; and
utilizing, by the broker, the credential to cause the secured entity to perform the action on behalf of the client device, the credential being inaccessible to the client device.

17. The method of claim 16, wherein the secured entity and the broker are located within a trusted environment, wherein the client device is located outside of the trusted environment, and wherein the method further comprises maintaining, by the broker, the credential within the trusted environment.

18. The method of claim 16, wherein the secured entity comprises an enclave of a computing system, and wherein receiving the request for performance of the action comprises receiving, by the broker, the request for performance of the action at an edge of the enclave.

19. The method of claim 16, further comprising retrieving, by the broker, a key from the secured entity, wherein the credential is generated based at least in part on the key.

20. The method of claim 19, further comprising:
determining, by the broker, that a validity time for the key has expired; and
refreshing, by the broker, the key with the secured entity based at least in part on the determination that the validity time for the key has expired.

* * * * *